United States Patent

Wang et al.

[19]

[11] Patent Number: 5,822,495

[45] Date of Patent: Oct. 13, 1998

[54] FUZZY RULE GENERATION APPARATUS FOR NEURO CIRCUIT NETWORK SYSTEM AND METHOD THEREOF

[75] Inventors: Bo-Hyeun Wang; Kwang-Bo Cho, both of Seoul, Rep. of Korea

[73] Assignee: LG Electronics, Inc., Seoul, Rep. of Korea

[21] Appl. No.: 618,374

[22] Filed: Mar. 19, 1996

[30] Foreign Application Priority Data

Apr. 17, 1995 [KR] Rep. of Korea .................. 95/8962

[51] Int. Cl.$^6$ ............................................ G06G 7/00
[52] U.S. Cl. ............................ 395/3; 395/24; 395/61; 395/900
[58] Field of Search ................... 395/3, 10–11, 395/50–51, 20–25, 27, 61

[56] References Cited

U.S. PATENT DOCUMENTS

| | | | |
|---|---|---|---|
| 5,444,820 | 8/1995 | Tzes et al. | 395/22 |
| 5,446,828 | 8/1995 | Woodall | 395/23 |
| 5,448,681 | 9/1995 | Khan | 395/11 |
| 5,455,890 | 10/1995 | Wang | 395/22 |
| 5,459,816 | 10/1995 | Basehore et al. | 395/3 |
| 5,579,439 | 11/1996 | Khan | 395/11 |

OTHER PUBLICATIONS

*IEEE Trans. Neural Networks,* 3 (5) (1992) 801–806; "On Fuzzy Modeling Using Fuzzy Neuroal Networks . . . ".

*IEEE Trans. Fuzzy Systems,* 1 (2) (1993) 85–97; "Neural Networks That Learn From Fuzzy If–Then Rules".

*Neural Networks,* 4 (1991) 207–224; "A Gaussian PotentialFunctionNetworkWithHierarchicallySelf–Organized...".

*IEEE Trans. Neural Networks,* 3 (5) (1992) 752–760; "Neural Networks Designed on Approximate Reasoning . . . ".

*Primary Examiner*—Tariq R. Hafiz

[57] ABSTRACT

An improved fuzzy rule generation apparatus for a neuro circuit network system and a method thereof capable of computing a fuzzy output and minimizing the number of fuzzy rules by automatically adjusting the number of fuzzy rules in accordance with a given problem and using general fuzzy function having a triangle shape or a trapezoid shape using a multi-parameter of a hidden layer and an output layer when computing a fuzzy output, which includes an input layer for receiving a plurality of data; a hidden layer for judging whether a plurality of data inputted thereto through the input layer is within an effective radius of a fuzzy variable and for automatically generating a fuzzy rule to an "n" number using the Gausian function in accordance with a result of the judgement; a parameter block for storing a parameter learned by an error back propagation learning so as to compute a fuzzy rule generated by the hidden layer; and an output layer for computing the last defuzzy operation using a fuzzy rule value generated by the hidden layer and a fuzzy variable value of a parameter block necessary for a defuzzy operation.

10 Claims, 7 Drawing Sheets

FUZZY RULE GENERATION APPARATUS FOR NEURO CIRCUIT NETWORK SYSTEM AND METHOD THEREOF

FIELD OF THE INVENTION

The present invention relates to a fuzzy rule generation apparatus for a neuro ciircuit network system and a method thereof, and particularly to an improved fuzzy rule generation apparatus for a neuro circuit network system and a method thereof capable of optimizing a parameter and decreasing the number of fuzzy rules by automatically adjusting the number of fuzzy rules in accordance with a given problem and simplifying a fuzzy output computation using a radial basis function, not by previously deciding the number of fuzzy rules.

DESCRIPTION OF THE CONVENTIONAL ART

The methods for generating fuzzy rule includes a first method of generating a first fuzzy rule from an input/output data using a heuristic algorithm, a second method of using a neuro circuit network system, a third method of using the Gausian function, and a fourth method of using a fuzzy linguistic variable.

The first method of generating a fuzzy rule using a heuristic algorithm has a disadvantage in that the reliability for generating a data analysis and a fuzzy rule is low, and many fuzzy rules are made.

Therefore, in order to overcome the above-mentioned problems which occurred due to the fuzzy rule generated using the heuristic algorithm, a new method of using a neuro circuit network system is introduced. In addition, in this case of this method, three types, as shown in FIG. 1, are known in the industry.

Figure 1A:
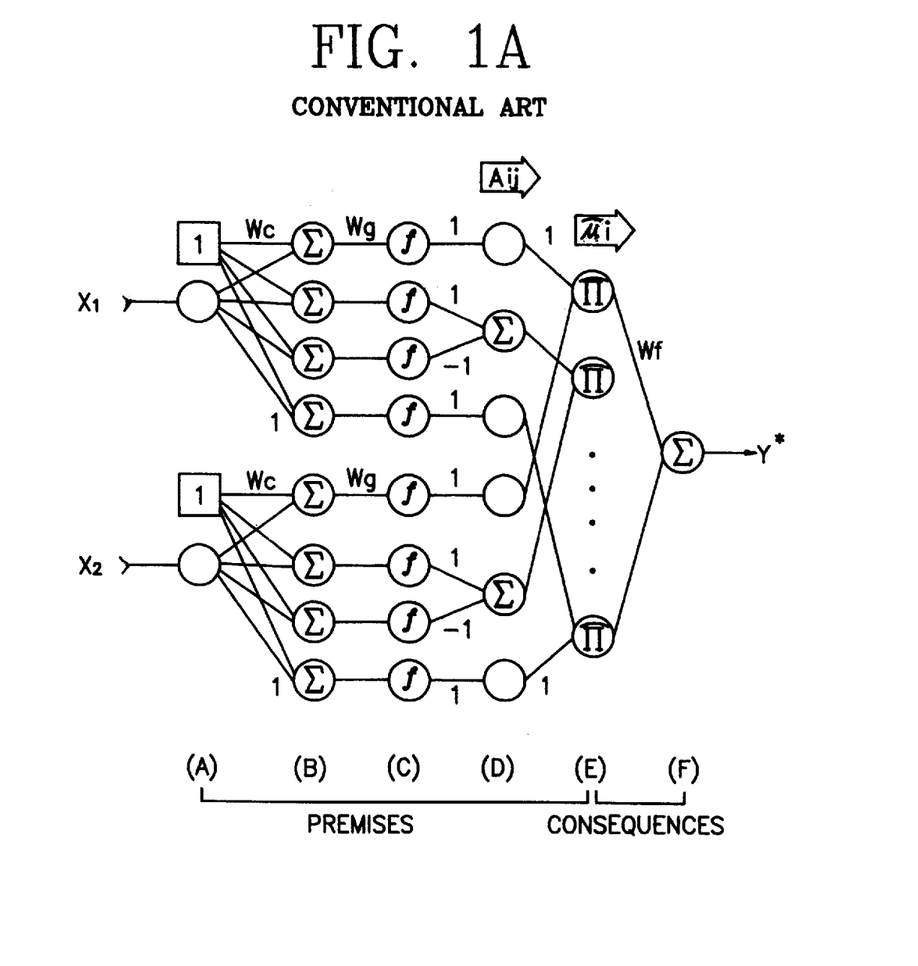
FIG. 1A is a view showing the construction of a fuzzy rule generation apparatus of a conventional neuro circuit network using a constant when computing a fuzzy output.

First, a first type, as shown in FIG. 1A, is the simplest case. That is, this type is directed to computing a fuzzy output using a crisp set.

Figure 1B:
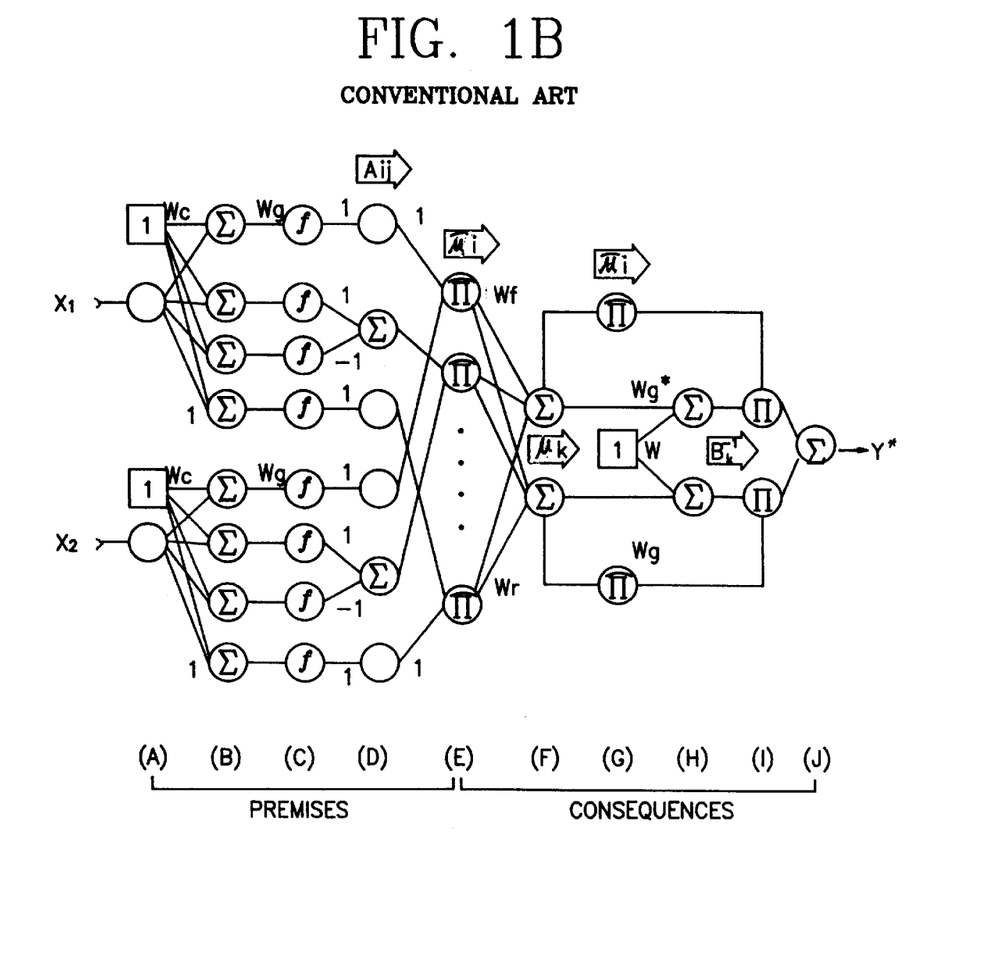
FIG. 1B is a view showing the construction of a fuzzy rule generation apparatus of a conventional neuro circuit network using an input function of the Sugeno when computing a fuzzy output.
Figure 1C:
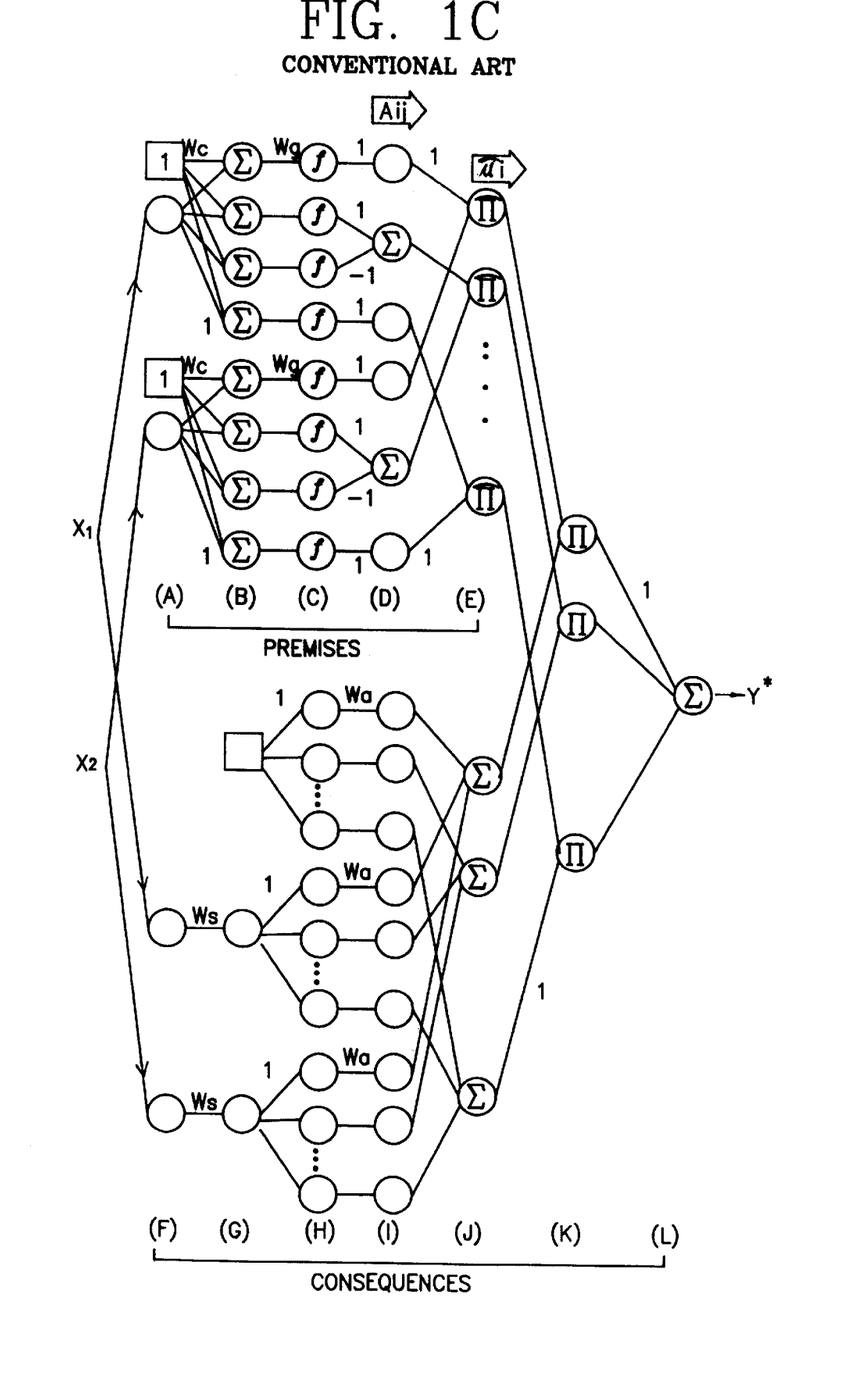
FIG. 1C is a view showing the construction of a fuzzy rule generation apparatus of a conventional neuro circuit network using a fuzzy variable when computing a fuzzy output.

Second, a second type, as shown in FIG. 1B, is suggested by the Sugeno. This type is the same as the first type except for a method of computing a fuzzy output as a first-order function of an input.

Third, a third type is directed to disadvantageously starting in a state that the number of fuzzy rules is previously prepared.

In addition, a membership function "f" of FIGS. 1A through 1C can be obtained through the following expression.

$$f = \frac{1}{1 + \exp(\text{input})}$$

In this case, an error back-propagation (EBP) algorithm is generally used.

Figure 2A:
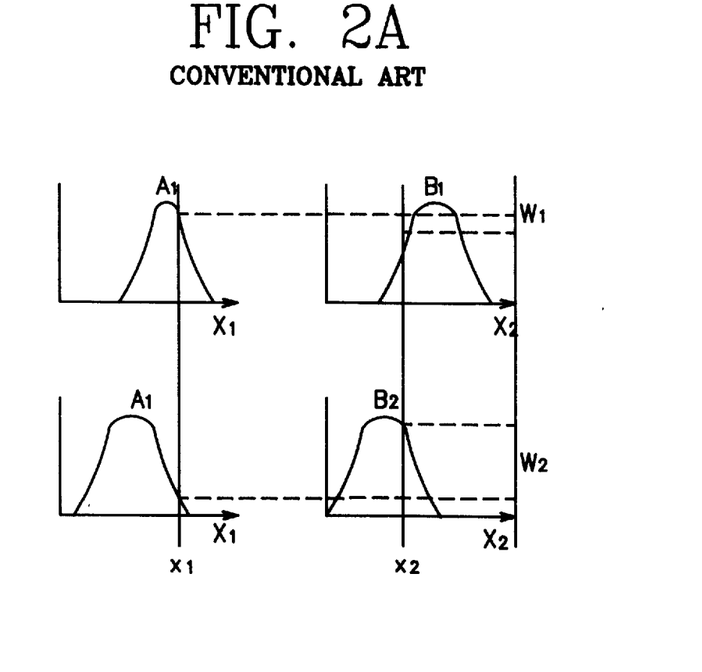
FIG. 2A is a graph of a fuzzy generation apparatus using the Gausian function in the conventional fuzzy rule generation apparatus.
Figure 2B:
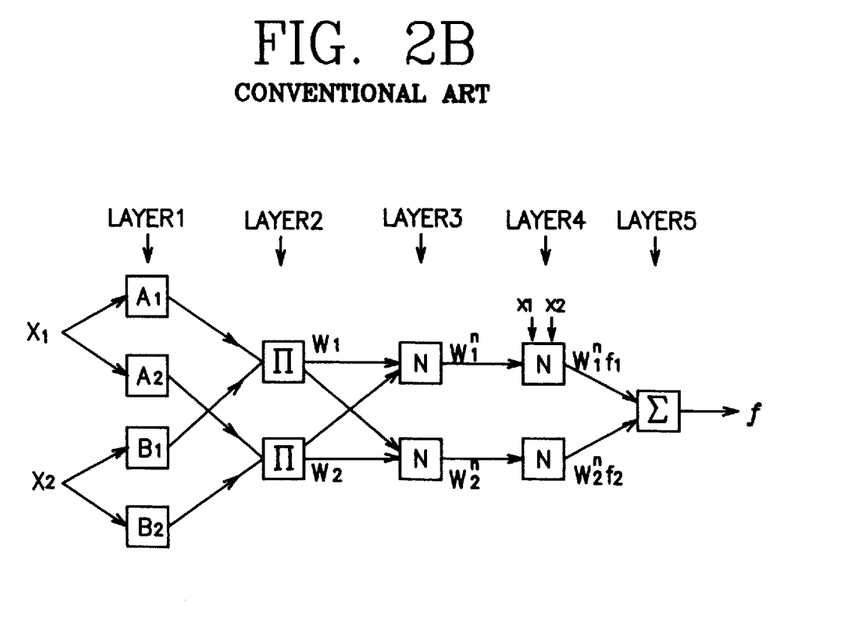
FIG. 2B is a view of the construction of a fuzzy rule generation apparatus using the Gausian function.

In addition, in the third method of using the Gausian function, as shown in FIG. 2, the membership function "f" is a type of the Gausian function, and a defuzzy function is directed to computing a fuzzy output using a fist order function of an input which is the Sugeno method same to the second type of the second method. An algorithm uses the EBP, and the number of the fuzzy rules is previously determined.

FIG. 2A shows a fuzzy deduction, and FIG. 2B shows an adaptation circuit network system indication. The membership function "f" of FIGS. 2A and 2B is obtained by the following expression.

$$f1 = a1\ x1 + b1\ x1 + c1,\ f2 = a2\ x2 + b2\ x2 + c2$$

Therefore, the function "f" can be expressed as follows.

$$f = \frac{w1 f1 + w2 f2}{w1 + w2} = w1^n f1 + w2^n f2.$$

In addition, the following expression can be obtained.

$$wi = Ri(x) = \exp\left[ -\frac{\|x-\|^2}{\delta i^2} \right]$$

Therefore, the above-mentioned method is referred to the second method of FIG. 1.

In addition, as shown in FIG. 2B, it is noted that the fuzzy deduction is the same as the radial basis function network under a predetermined condition.

Meanwhile, the fourth method is directed to converting the general fuzzy system into a neuro circuit network system. In particular, the system is constructed by the fuzzy linguistic variable, and is learned by the EBP.

Here, there are provided the number of fuzzy rules same as a predetermined number.

Recently, a fuzzy rule using a radial basis function (RBF) was introduced in the industry so as to form a fuzzy system.

However, most of the case a similar to the method of FIG. 1A in the second method, and rarely to the method of FIG. 1B.

In addition, a method for generating a fuzzy rule is referred to a hidden layer method in the radial basis function network, a K-means algorithm method for determining the number of neurons, a learning vector quantization (LVQ) method, a self-organizing method, and the like.

However, the conventional fuzzy rule generating apparatus has disadvantages in that when using a neuro circuit network system for implementing a fuzzy system, the number of fuzzy rules should be set, and the system is started, and since the number of fuzzy rules are previously set, and the operation is operated, it is difficult to use a triangle shape function and a trapezoid shape function when computing a fuzzy output.

SUMMARY OF THE INVENTION

Accordingly, it is an object of the present invention to provide a fuzzy rule generation apparatus for a neural circuit network system and a method thereof, which overcome the problems encountered in the conventional fuzzy rule generation apparatus for a neural circuit network system and a method thereof.

There is another object of the present invention to provide a fuzzy rule generation apparatus for a neuro circuit network system and a method thereof capable of computing a fuzzy output and minimizing the number of fuzzy rules by automatically adjusting the number of fuzzy rules in accordance with a given problem and using a general fuzzy function having a triangle shape or a trapezoid shape using a multi-parameter of a hidden layer and an output layer when computing a fuzzy output.

To achieve the above objects, there is provided a fuzzy rule generation apparatus for a neuro circuit network system, which includes an input layer for receiving a plurality of data; a hidden layer for judging whether a plurality of data inputted thereto through the input layer is within an effective radius of a fuzzy variable and for automatically generating a number of fuzzy rules "n" number using the Gausian function in accordance with a result of the judgement; a parameter block for storing a parameter learned by an error back propagation learning so as to compute a fuzzy rule generated by the hidden layer; and an output layer for computing the last defuzzy operation using a fuzzy rule value generated by the hidden layer and a fuzzy variable value of a parameter block necessary for a defuzzy operation.

To achieve the above objects, there is provided a fuzzy rule generation method for a neuro circuit network system, which includes the steps of a first step which generates a first hidden neuron by receiving a first data through an input layer, sets the first data as a center value, and sets a reference deviation value and an initial value of a parameter of a fuzzy variable in accordance with a fuzzy variable to be used; a second step which judges whether the next data outputted through the input layer corresponds to a first hidden neuron, generates a new hidden neuron using a simple hierarchically self-organizing learning, and sets another parameter; a third step which repeatedly performs the second step so that all data given can be processed when the next data corresponds to the first hidden neuron; a fourth step which learns a parameter learned by an error back-propagation learning and judges a learned data corresponds to the first hidden neuron when a process with respect to all data inputted is completed; and a sixth step which judges whether the number of learning or errors reaches a predetermined level when the learned data corresponds to a predetermined level, repeatedly performs the third and fourth steps when the number of learning or errors does not reach the same, computes a hidden neuron value and a parameter value generated by the second step and fourth step when the number of learning or errors reaches the same, and generates a defuzzy operation value,

DETAILED DESCRIPTION OF THE INVENTION

Figure 3:
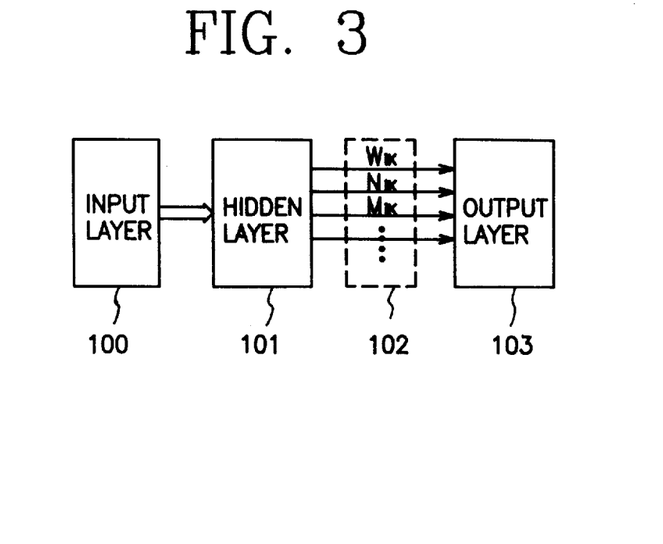
FIG. 3 is a view of the construction of a fuzzy rule generation apparatus for a neuro circuit network system according to the present invention.
Figure 4:
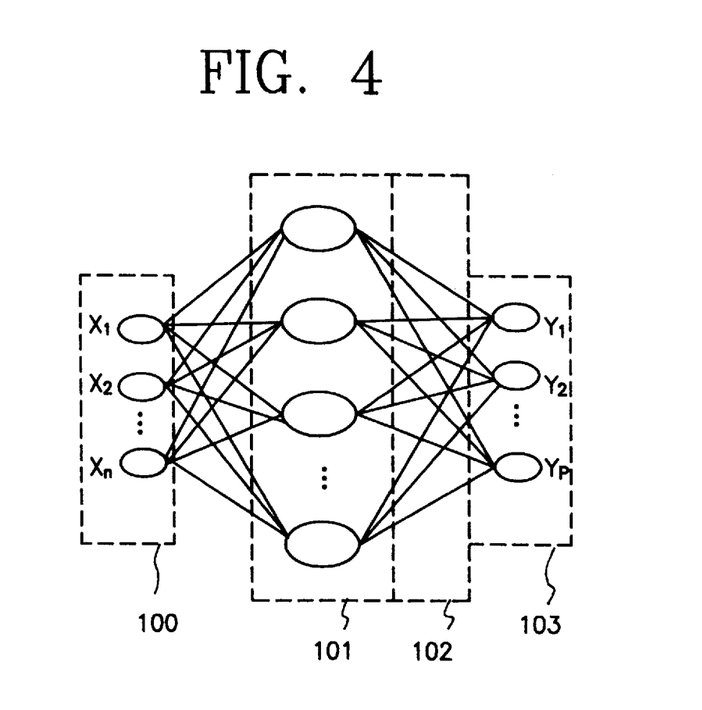
FIG. 4 is a detailed view of an input layer, a hidden layer, a parameter block, and an output layer of FIG. 3 according to the present invention.

Referring to FIGS. 3 and 4, the fuzzy rule generation apparatus for a neuro circuit network system includes an input layer 100 for receiving a plurality of date X1, X2, ..., Xn, a hidden layer 101 for computing the Gausian function with respect to a plurality of data X1, X2, ..., Xn outputted through the input layer 100 and for generating a variable number, 7, of fuzzy rules, a parameter block 102 for storing a parameter of a fuzzy variable for computing a fuzzy rule generated by the hidden layer 101, and an output layer 103 for computing the last fuzzy generation using the parameter wik, mik, nik, lik, ..., etc, of the parameter block 102 which are necessary for the fuzzy rule and fuzzy generation and for obtaining output values y1, y2, ..., yp.

Figure 6:
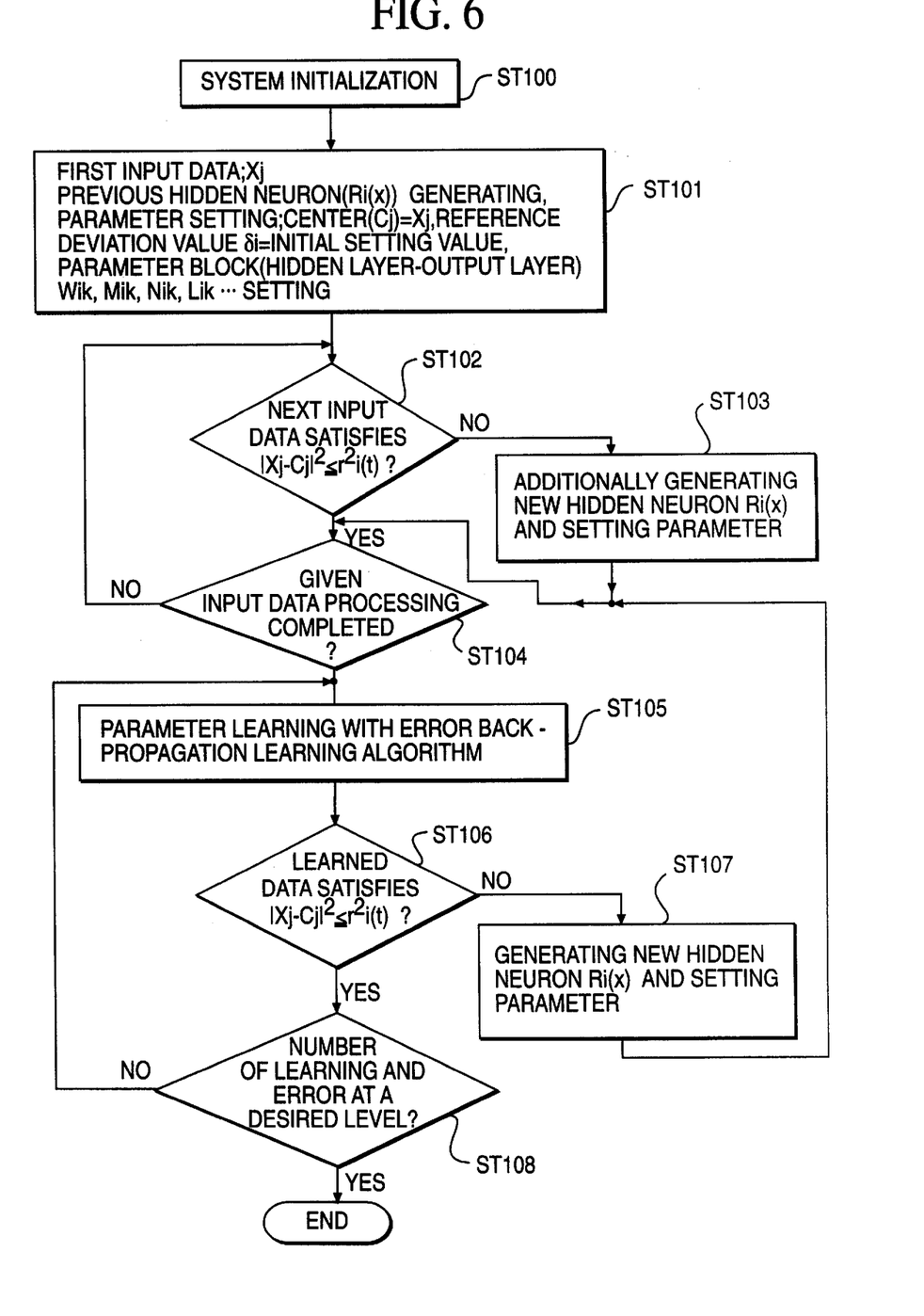
FIG. 6 is a flow chart of a fuzzy rule generation signal of a neuro circuit network system of FIG. 3 according to the present invention.

In addition, the fuzzy rule generation method of the neuro circuit network system according to the present invention, as shown in FIG. 6, includes the steps of a step ST101 in which is generated a first hidden neuron $Ri(x)$ using a first input date Xj outputted from the input layer 100 (after a step 100 is performed for a system initialization), in which are set a reference deviation value $\delta j$, parameters wik, mik, nik, ..., etc and the first input data Xj as a center value Cj, a step ST102 in which is received the next input data Xj inputted thereto through the input layer 100 and in which it is judged whether the absolute value of a difference between the current input data $ri(t)$ and the center value Cj in the hidden neuron $Rj(x)$ under consideration is within an effective radius $ri(t)$ of a fuzzy variable, that is, whether or not $|Xj-Cj|^2 \leq r^2i(t)|$, a step ST103 in which is generated a new hidden neuron $Ri(x)$ when the absolute value $|Xj-Cj|^2$ is not within the effective radius $r^2i(t)$ as a result of the step ST102, a step ST104 in which it is decided to repeat the step ST102 when all input data has not yet been processed a step ST105 in which is learned a parameter of a fuzzy variable using an EBP learning algorithm when the previous neuron $Rj(x)$ is generated with respect to a learning algorithm, a step ST106 in which it is judged whether all data learned by the step ST105 is within the effective radius $r^2i(t)$, a step ST107 which is generated a new hidden neuron $Rj(x)$ when the learned data is not within the effective radius $r^2i(t)$ and in which is set a parameter, and a step ST108 in which it is judged whether or not the given number of learning iterations or an error reaches a predetermined level when the learned data is within the effective radius. The parameter learning step ST105 is repeatedly performed when the number of learning iterations or the error does not reach thereto. Flow ends when the number thereof or the error reaches the level.

The operation and effects of the fuzzy rule generation apparatus for a neuro circuit system and a method thereof will now be explained with reference to FIGS. 3 through 6.

To begin with, referring to FIG. 3, when data X1, X2, ..., Xn are inputted from the input layer 100, the hidden layer 101 computes the Gausian function with respect to a plurality of inputted data X1, X2, ..., Xn, generates the fuzzy rules of an "n" number with respect to the inputted data, and provides it to the parameter block 102.

The parameter block 102 stores the parameter of the fuzzy variable so as to compute the fuzzy rule generated by the hidden layer 101 and provides the fuzzy variable value to the output layer 103 in accordance with the fuzzy rule generated by the hidden layer 101.

The output layer 103 computes a fuzzy rule value generated by the hidden layer 101 and output values y1, y2, ..., yp using parameters wik, mik, nik, lik, etc of a fuzzy variable stored in the parameter block 102.

Referring to FIG. 6, the above-mentioned process will now be explained in more detail.

Here, as learning methods of computing a fuzzy output value, there are a simple hierarchically self-organizing learning (HSOL) and a hierarchically structural self-organizing learning (HSSOL).

To begin with, the HSOL method is directed to automatically providing a hidden layer 101, that is, a hidden neuron. When the system is initialized (ST100), there is not an output value of the hidden neuron Ri(X) of the hidden layed 101 and the output layer 103 in the fuzzy rule generation apparatus of a neuro circuit network system.

In addition, when the initialization is performed, when data X1, X2, . . . , Xn are inputted from the input layer 100, the first hidden neuron Ri(x) is generated with respect to the inputted first data Xj in the hidden layer 101.

$$Ri(x) = \exp\left[\sum_{j=1}^{n} \frac{|Xj - Cj|^2}{2\delta^2 j}\right]$$

where i denotes the number of hidden layers wherein i=1.

After the hidden neuron Ri(x) is generated the parameters wik, mik, nik of a fuzzy variable and a reference deviation value δj are initialized in the parameter block 102 in accordance with a fuzzy variable to be used, and an input data Xj is set as a center value Cj (ST101). Here, the reference deviation value δj may be set as 0.1.

Thereafter, when the second data Xj is inputted from the input layer 100, it is judge whether the inputted second data Xj corresponds to the previous hidden neuron Ri(x) generated by the step ST101 in accordance with an effective radius ri(t) of a fuzzy variable. That is, it is judged whether the current input data Xj value and the center value Cj satisfy an expression $|Xj-CJ|^2$ (ST102). Here, the effective radius ri(t) is set as 1 and 0 as a an initialization value.

As a result of the step ST102, when the expression $|Xj-Cj|^2 \leq r^2 i(t)|$ is satisfied, it is judged that the current input data Xj outputted from the input layer 100 is within the hidden neuron Ri(X), and the next step ST104 is performed. When the expression $|Xj-Cj|^2 \leq r^2 i(t)|$ is not satisfied, it is judged that the first hidden neuron Ri(X) does not correspond to the first hidden neuron Ri(x), and a new hidden neuron is additionally generated, and other variables (ST103) are set as in the step ST101.

In addition, in the step ST104, it is judged that whether or not all data Xj from the input layer 100 have been processed. When there exists an input data Xj yet to be processed, the step ST102 and, possibly, step ST103 are repeatedly performed.

Meanwhile, when the steps ST104 determines that all input data Xj have been processed, in the parameter block 102, the parameters wik, mik, nik, lik, etc of a fuzzy variable, the center value Cj, the reference deviation value δj, etc are learned using the error back-propagation algorithm in (ST105). Here, the error back-propagation learning algorithm is expressed as "Ep=½■(t−0)², where t denotes a target, and 0 denotes an output.

For instance, the previous center value $Cj^{old}$ and a center variation value n√C of a fuzzy variation value are added, and thus a new center value $Cj^{new}$ is obtained thereby, so that a center value Cj is learned.

Thereafter, it is judged that the learned data satisfies an expression $|Xj-Cj|^2 \leq r^2 i(t)|$ (ST106).

As a result of the judgement of the step ST106, when the learned data does not satisfy the expression $|Xj-Cj|^2 \leq r^2 i(t)|$, a new hidden neuron Ri(X) is generated (ST107), and other variables are set as in the step ST101.

Meanwhile, as a result of the step ST106, when the learned data satisfies the expression $|Xj-Cj|^2 \leq r^2 i(t)|$, it is judged that the number of learning iterations and error have reached a desired revel (ST109). When the number of learning and error do not reach the level, the parameter learning step ST105 is repeatedly performed, and the learning is completed.

Next, in the HSSOL method of the hierarchical structure, when generating a new hidden neuron Ri(X) in the step ST103 of the HSOL algorithm, the effective parameter radius Rep is set as a predetermined value (for instance, Rep=0.1), and it is judged that a parameter $p^{new}$ which is newly generated from the parameter groups (for instance, {C, δ}, {w}, {m}, {n}, etc) and the previous parameter $p^{old}$ satisfy an expression $\|p^{old}-p^{new}\| \leq Rep$, and when a newly generated parameter $p^{new}$ satisfies the expression $\|p^{old}-p^{new}\| \leq Rep$, the newly set parameter $p^{new}$ is set as a previous parameter $p^{old}$. That is, an expression of $p^{new}=p^{old}$ can be obtained.

Meanwhile, when the newly generated parameter $p^{new}$ does not satisfy the expression $\|p^{old}-p^{new}\| \leq Rep$, the HSSOL method is operated in the same manner as the steps ST102 and ST103 of the HSOL.

In addition, the HSOOL method learns the parameter of a fuzzy variable using an EBP, it is learned as a global EBP.

That is, parameters $p1^{old}=p2^{old}=p3^{old}$ is converted into new parameters $p1^{new}=p2^{new}=p3^{new}$.

The reasons for learning the parameter of a fuzzy variable as a global EBP is that in the HSOL when generating a fuzzy rule, there may be generated similar fuzzy rules. Therefore, the above-mentioned problems can be overcome by learning a parameter of a fuzzy variable as an EBP in the HSSOL.

Meanwhile, in the output layer 103, output values y1, y2, . . . , yp are obtained by computing the last defuzzy operation using the fuzzy rule value of the hidden layer 101, that is, a hidden neuron Ri(X) and fuzzy variables wik, mik, nik, lik, etc of the parameter block 102 which is necessary for the fuzzy rule value.

Figure 5A:
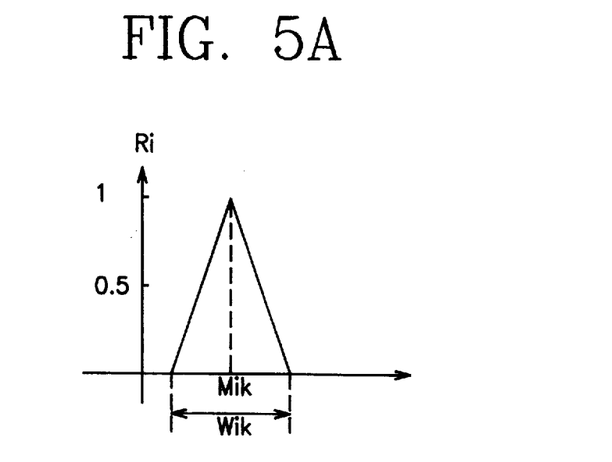
FIG. 5A is a view of a fuzzy output computation so as to show a triangle shape fuzzy variable of FIG. 3 according to the present invention.
Figure 5B:
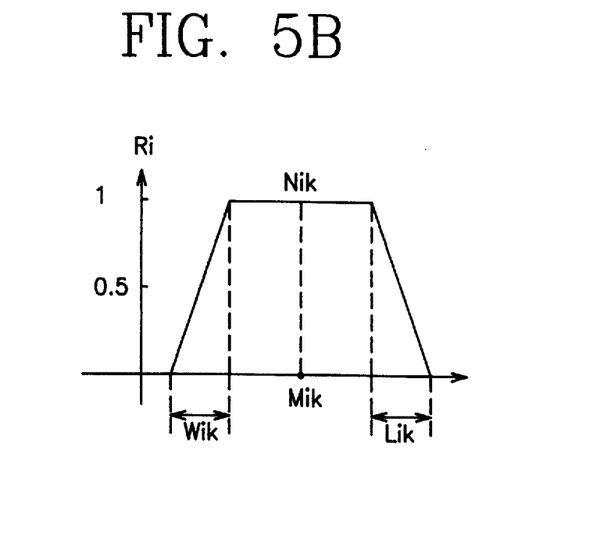
FIG. 5B is a view of a fuzzy output computation so as to show a trapezoid shape variable of FIG. 3 according to the present invention.

For instance, when a membership function μi, as shown in FIG. 5A, is a triangle shape, the fuzzy output Y*k can be obtained for a defuzzy operation through the following expression.

$$\text{That is, } \mu i(wik) = \sum_{i=1}^{m} Ri \frac{wik}{2},$$

$$\text{therefore, } Y^*k = \frac{\sum_{i=1}^{m} \mu i (wik) \, mik}{\sum_{i=1}^{n} \mu i (wik)}$$

In addition, when the membership function μi, as shown in FIG. 6B, is a trapezoid shape that includes triangle shapes, it is possible to obtain a fuzzy output using three fuzzy variable values wik, nik and lik.

That is, $$\mu i(wik, nik, lik) = \sum_{i=1}^{m} Ri^* \left(\frac{wik}{2} + nik + \frac{lik}{2}\right)$$

Therefore, the defuzzy operation output value Y*k of the output layer can be expressed as follows.

$$Y^*k = \frac{\sum_{i=1}^{m} \mu i\,(wik)\,mik}{\sum_{i=1}^{n} \mu i\,(wik)}$$

That is, the output value can be obtained by a defuzzy operation in accordance with a fuzzy variable to be used.

As described above, the fuzzy rule generation apparatus for a neuro circuit network system and a method thereof is directed to automatically adjusting the number of fuzzy rules in accordance with a given problem, and to computing a fuzzy output using a multi-parameter of a hidden layer and an output layer when computing a fuzzy output and using a general fuzzy variable such as a triangle shape or a trapezoid shape, and when adapting the present invention to a general fuzzy system, the rule of the fuzzy system is optimized. In addition, when implementing a new fuzzy system, the operation thereof is very effective. Moreover, the parameter is optimized by the learning, and the number of fuzzy rules is sharply reduced.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A fuzzy rule generation apparatus for a neuro circuit network system, comprising:

an input layer for receiving a plurality of data;

a hidden layer for judging whether said plurality of data inputted thereto through said input layer is within an effective radius of a fuzzy variable and for automatically generating a number of fuzzy rules using the Gausian function until each of said data is within said effective radius of one of said fuzzy rules;

a parameter block for storing a parameter learned by error back propagation so as to compute a fuzzy rule generated by said hidden layer; and an output layer for computing the last defuzzy operation using a fuzzy rule value generated by the hidden layer and a fuzzy variable value of a parameter block necessary for a defuzzy operation.

2. The apparatus of claim 1, wherein said hidden layer and said output layer are connected by at least more than two parameter blocks.

3. A fuzzy rule generation method for a neuro circuit network system, comprising the steps of:

a first step which generates a first hidden neuron by receiving data through an input layer, sets one of said data as a center value, and sets a reference deviation value and an initial value of a parameter of a fuzzy variable in accordance with a fuzzy variable to be used;

a second step which judges whether the next data received through the input layer corresponds to a first hidden neuron, generates a new hidden neuron when the next data does not correspond to the first hidden neuron, and sets another parameter;

a third step which repeatedly performs said second step until each of said data corresponds to one of said hidden neurons;

a fourth step which learns a parameter through error back-propagation and judges whether a learned datum corresponds to one of the hidden neurons;

a fifth step which generates a new neuron when the learned datum does not correspond to said one of the hidden neurons, and sets a parameter; and a sixth step which judges whether the number of learning iterations or errors reaches a predetermined level when the learned datum corresponds to said one of the hidden neurons, and if not, repeats said fourth step and if so, generates a defuzzy operation value by computing the hidden neuron and the predetermined parameter value which were generated in the second step and the fourth step.

4. The method of claim 3, wherein said hidden neuron Ri(X) is obtained by the following expression:

$$Ri(X) = \exp\left[ -\sum_{j=1}^{n} \frac{|xj - cj|^2}{2\delta^2 j} \right]$$

where $Xj$ denoted an input data, $Cj$ denotes a center value, and $\delta^2 j$ denotes a reference deviation value.

5. The method of claim 3, wherein said second step and said fourth step is directed to judging whether an input data Xj corresponds to the first hidden neuron when an expression $|Xj-Cj|^2 \leq r^2 i$ is satisfied.

6. The method of claim 3, wherein said error back-propagation learning (Ep) is achieved by the following expression:

$$Ep = \tfrac{1}{2}\blacksquare(t-0)^2$$

where t denotes a target, and 0 denotes an output value.

7. The method of claim 3, wherein said second step is directed to generating a new hidden neuron using a hierarchically structural self-organizing learning method.

8. The method of claim 7, wherein when a new hidden neuron is generated said hierarchically structural self-organizing learning method is performed by the following steps of:

one step which sets effective parameter radii and judges whether a parameter newly generated from an existing parameter among each parameter group is within effective parameter radii; and another step which sets a currently generated parameter as a previous parameter when the newly generated parameter is within the effective parameter radius and performs the hierarchical self-organizing learning when the newly generated parameter is not within the same.

9. The method of claim 8, wherein a condition that said newly generated parameter is within the effective parameter radii can be expressed as follows:

$$\|p^{old} - p^{new}\| \leq Rep$$

where $p^{old}$ denotes a previous parameter, $p^{new}$ denotes a newly generated parameter.

10. The method of claim 8, wherein said hierarchically structural self-organizing learning includes a step which learns a parameter learned by a global error back-propagation and converts the previous same parameter into a current same parameter.

* * * * *